United States Patent
Shen et al.

(10) Patent No.: US 10,659,263 B2
(45) Date of Patent: May 19, 2020

(54) REFERENCE SIGNAL SEQUENCE DETERMINATION IN A WIRELESS COMMUNICATION SYSTEM

(71) Applicant: Lenovo Innovations Limited (Hong Kong), Hong Kong (CN)

(72) Inventors: Zukang Shen, Beijing (CN); Zhi Yan, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 1 day.

(21) Appl. No.: 15/460,937

(22) Filed: Mar. 16, 2017

(65) Prior Publication Data

US 2017/0272287 A1 Sep. 21, 2017

(30) Foreign Application Priority Data

Mar. 16, 2016 (WO) ................ PCT/CN2016/076545

(51) Int. Cl.
*H04L 27/00* (2006.01)
*H04L 12/26* (2006.01)
*H04L 5/00* (2006.01)
*H04J 11/00* (2006.01)

(52) U.S. Cl.
CPC ........ *H04L 27/0012* (2013.01); *H04L 5/0048* (2013.01); *H04L 43/16* (2013.01); *H04J 2011/0009* (2013.01)

(58) Field of Classification Search
CPC ... H04L 27/0012; H04L 5/0048; H04L 43/16; H04J 2011/0009

USPC ......................................................... 370/203
See application file for complete search history.

(56) References Cited

U.S. PATENT DOCUMENTS

| | | | |
|---|---|---|---|
| 9,924,542 B2 * | 3/2018 | Eriksson | H04W 74/0833 |
| 2007/0217534 A1 * | 9/2007 | Lee | H04L 27/2656 375/260 |
| 2008/0298488 A1 * | 12/2008 | Shen | H04W 72/0406 375/260 |

(Continued)

FOREIGN PATENT DOCUMENTS

WO 2009/028876 A2 3/2009

OTHER PUBLICATIONS

PCT/CN2016/076545, International Search Report and Written Opinion, dated Dec. 8, 2016, pp. 1-11.

(Continued)

*Primary Examiner* — Faisal Choudhury
(74) *Attorney, Agent, or Firm* — Kunzler Bean & Adamson

(57) ABSTRACT

Apparatuses, methods, and systems are disclosed for reference signal sequence determination. One apparatus includes a processor that determines an RS sequence for transmission. The RS sequence includes three symbols determined by the following equation: $\bar{r}_u(n)=e^{j\varphi(n)\pi/4}$. The RS sequence includes: a first RS sequence, wherein $\bar{r}_u(n)$ is the first RS sequence, n=0 to 2, $\varphi(0)=-3$, $\varphi(1)=-3$, and $\varphi(2)=-1$; or a second RS sequence, wherein $\bar{r}_u(n)$ is the second RS sequence, n=0 to 2, $\varphi(0)=-3$, $\varphi(1)=1$, and $\varphi(2)=1$. The apparatus also includes a transmitter that transmits the RS sequence on a time-frequency resource.

21 Claims, 9 Drawing Sheets

(56) References Cited

U.S. PATENT DOCUMENTS

| | | | |
|---|---|---|---|
| 2008/0318528 A1* | 12/2008 | Hooli | H04J 13/0062 |
| | | | 455/62 |
| 2009/0080500 A1 | 3/2009 | Muharemovic et al. | |
| 2009/0196229 A1* | 8/2009 | Shen | H04B 1/69 |
| | | | 370/328 |
| 2010/0034165 A1* | 2/2010 | Han | H04L 5/023 |
| | | | 370/330 |
| 2010/0317343 A1* | 12/2010 | Krishnamurthy | G01S 1/30 |
| | | | 455/435.1 |
| 2011/0205994 A1* | 8/2011 | Han | H04L 1/0668 |
| | | | 370/329 |
| 2012/0093090 A1* | 4/2012 | Han | H04B 7/0689 |
| | | | 370/328 |
| 2013/0322391 A1* | 12/2013 | Yang | H04L 5/001 |
| | | | 370/329 |
| 2016/0007377 A1* | 1/2016 | Frenne | H04W 56/001 |
| | | | 370/329 |
| 2016/0211960 A1* | 7/2016 | Wang | H04L 25/0224 |
| 2017/0078830 A1* | 3/2017 | Wu | H04W 4/70 |

OTHER PUBLICATIONS

Lge et al., "Way forward on computer generated DM RS sequences", 3GPP TSG RAN WG1 Meeting #50bis R1-074509, Oct. 8-12, 2007, pp. 1-2.

Nokia Networks, et al., "On UL DMRS design for NB0IoT, "3GPP TSG RAN1 meeting #84 R1-160455. Feb. 15-19, 2016, pp. 1-4.

\* cited by examiner

REFERENCE SIGNAL SEQUENCE DETERMINATION IN A WIRELESS COMMUNICATION SYSTEM

FIELD

The subject matter disclosed herein relates generally to wireless communications and more particularly relates to reference signal ("RS") sequence determination in a wireless communication system.

BACKGROUND

The following abbreviations are herewith defined, at least some of which are referred to within the following description.

3GPP Third Generation Partnership Project
ACK Positive-Acknowledgment
ANDSF Access Network Discovery and Selection Function
AP Access Point
APN Access Point Name
AS Access Stratum
BLER Block Error Ratio
BPSK Binary Phase Shift Keying
CAZAC Constant Amplitude Zero Auto Correction
CCA Clear Channel Assessment
CCE Control Channel Element
CP Cyclic Prefix
CQI Channel Quality Information
CSI Channel State Information
CRS Cell-Specific Reference Signal
CSS Common Search Space
DCI Downlink Control Information
DL Downlink
DMRS Demodulation Reference Signal
EDGE Enhanced Data Rates for Global Evolution
eNB Evolved Node B
EPDCCH Enhanced Physical Downlink Control Channel
E-RAB E-UTRAN Radio Access Bearer
ETSI European Telecommunications Standards Institute
E-UTRAN Evolved Universal Terrestrial Radio Access Network
FBE Frame Based Equipment
FDD Frequency Division Duplex
FDMA Frequency Division Multiple Access
FEC Forward Error Correction
GERAN GSM/EDGE Radio Access Network
GPRS General Packet Radio Service
GSM Global System for Mobile Communication
GTP GPRS Tunneling Protocol
HARQ Hybrid Automatic Repeat Request
H-PLMN Home Public Land Mobile Network
IoT Internet-of-Things
IP Internet Protocol
ISRP Inter-System Routing Policy
LAA Licensed Assisted Access
LBE Load Based Equipment
LBT Listen-Before-Talk
LTE Long Term Evolution
MCL Minimum Coupling Loss
MCS Modulation and Coding Scheme
MME Mobility Management Entity
MU-MIMO Multi-User, Multiple-Input, Multiple-Output
NACK or NAK Negative-Acknowledgment
NAS Non-Access Stratum
NBIFOM Network-Based IP Flow Mobility
NB-IoT NarrowBand Internet of Things
OFDM Orthogonal Frequency Division Multiplexing
PCell Primary Cell
PBCH Physical Broadcast Channel
PCID Physical Cell Identification ("ID")
PCO Protocol Configuration Options
PCRF Policy and Charging Rules Function
PDCCH Physical Downlink Control Channel
PDCP Packet Data Convergence Protocol
PDN Packet Data Network
PDSCH Physical Downlink Shared Channel
PDU Protocol Data Unit
PGW Packet Data Network Gateway
PHICH Physical Hybrid ARQ Indicator Channel
PLMN Public Land Mobile Network
PRACH Physical Random Access Channel
PRB Physical Resource Block
PSS Primary Synchronization Signal
PUCCH Physical Uplink Control Channel
PUSCH Physical Uplink Shared Channel
QoS Quality of Service
QPSK Quadrature Phase Shift Keying
RAB Radio Access Bearer
RAN Radio Access Network
RAR Random Access Response
RE Resource Element
RRC Radio Resource Control
RS Reference Signal
RX Receive
SC-FDMA Single Carrier Frequency Division Multiple Access
SCell Secondary Cell
SCH Shared Channel
SGW Serving Gateway
SIB System Information Block
SINR Signal-to-Interference-Plus-Noise Ratio
SR Scheduling Request
SSS Secondary Synchronization Signal
TAU Tracking Area Update
TBS Transport Block Size
TCP Transmission Control Protocol
TDD Time-Division Duplex
TDM Time Division Multiplex
TED Tunnel Endpoint Identification ("ID")
TX Transmit
UCI Uplink Control Information
UE User Entity/Equipment (Mobile Terminal)
UL Uplink
UMTS Universal Mobile Telecommunications System
V-PLMN Visited Public Land Mobile Network
WiMAX Worldwide Interoperability for Microwave Access
WLAN Wireless Local Area Network In wireless communications networks, a frame structure for LTE FDD may be used. A radio frame of 10 milliseconds ("ms") may include 10 subframes, each of which is 1 ms. Each subframe further may include two slots, each of which is 0.5 ms. Within each slot, a number of SC-FDMA symbols may be transmitted for UL transmission. The transmitted signal in each slot on an antenna port may be described by a resource grid comprising $N_{RB}^{UL} N_{sc}^{RB}$ subcarriers and $N_{symb}^{UL}$ OFDM symbols, where $N_{RB}^{UL}$ is number of RBs in the UL (which is dependent on the transmission bandwidth of a cell); $N_{sc}^{RB}$ is the number of subcarriers in each RB; and each subcarrier occupies a certain frequency of size $\Delta f$. The values of $N_{sc}^{RB}$, $\Delta f$, and $N_{symb}^{UL}$ may depend on a cyclic prefix as shown in Table 1.

TABLE 1

| Configuration | | $N_{sc}^{RB}$ | $N_{symb}^{UL}$ |
|---|---|---|---|
| Normal Cyclic Prefix | Δf = 15 kHz | 12 | 7 |
| Extended Cyclic Prefix | Δf = 15 kHz | 12 | 6 |

Two types of uplink reference signals may be supported in an LTE system: demodulation reference signals that are associated with transmission of PUSCH or PUCCH; and sounding reference signals that are not associated with transmission of PUSCH or PUCCH. The same set of base sequences may be used for demodulation and sounding reference signals. A reference signal sequence $r_{u,v}^{(\alpha)}(n)$ may be defined by a cyclic shift α of a base sequence $\bar{r}_{u,v}(n)$ according to: $r_{u,v}^{(\alpha)}(n) = e^{j\alpha n} \bar{r}_{u,v}(n)$, $0 \leq n < M_{sc}^{RS}$ where $M_{sc}^{RS} = mN_{sc}^{RB}$ is the length of the reference signal sequence and $1 \leq m \leq N_{RB}^{max,UL}$. Multiple reference signal sequences may be defined from a single base sequence through different values of α.

Base sequences $\bar{r}_{u,v}(n)$ may be divided into groups, where $u \in \{0, 1, \ldots, 29\}$ is the group number and v is the base sequence number within the group, such that each group contains one base sequence (v=0) of each length $M_{sc}^{RS} = mN_{sc}^{RB}$, $1 \leq m \leq 5$ and two base sequences (v=0,1) of each length $M_{sc}^{RS} = mN_{sc}^{RB}$, $6 \leq m \leq N_{RB}^{max,UL}$. The sequence group number u and the number v within the group may vary in time. The definition of the base sequence $\bar{r}_{u,v}(0), \ldots, \bar{r}_{u,v}(M_{sc}^{RS}-1)$ may depend on the sequence length $M_{sc}^{RS}$.

For $M_{sc}^{RS} = N_{sc}^{RB}$ and $M_{sc}^{RS} = 2N_{sc}^{RB}$, the base sequence is given by: $\bar{r}_{u,v} = e^{j\varphi(n)\pi/4}$, $0 \leq n \leq M_{sc}^{RS} - 1$ where the value of φ(n) for $M_{sc}^{RS} = N_{sc}^{RB}$ is given by Table 2, as an example.

TABLE 2

| u | φ(0), ..., φ(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| ... | | | | | | | | | | | | |
| ... | | | | | | | | | | | | |

NarrowBand IoT ("NB-IoT") specifies a radio access technology for cellular internet of things that addresses improved indoor coverage, support for massive number of low throughput devices, low delay sensitivity, ultra-low device cost, low device power consumption, and (optimized) network architecture.

NB-IoT may support the following different modes of operation: "Stand-alone operation" utilizing, for example, the spectrum currently being used by GERAN systems as a replacement of one or more GSM carriers; "Guard band operation" utilizing the unused resource blocks within an LTE carrier's guard-band; and "In-band operation" utilizing resource blocks within a normal LTE carrier.

An NB-IoT may support an RF and baseband bandwidth of 180 kHz, which is equivalent to one LTE Physical Resource Block ("PRB"). A unified DL design with 15 kHz subcarrier spacing for all three modes of operation may be used.

For UL both single tone and multi-tone operations may be supported. Specifically, for single tone transmissions, two numerologies (3.75 kHz, 15 kHz) may be configurable by the network. Moreover, for multi-tone transmissions, SC-FDMA with 15 kHz UL subcarrier spacing based transmission may be supported. This support structure follows the subframe structure of LTE PUSCH.

Three numerologies and resource unit configurations may be used. Specifically, a first structure using 12 subcarriers (15 kHz) with a 1 msec resource unit size; a second structure using 6 subcarriers with a 2 msec resource unit size; and a third structure using 3 subcarriers with a 4 msec resource unit size.

The slot format may be the same for NB-IoT in the multi-tone transmissions as it is in LTE. Accordingly, UL DMRS may use the same positions in NB-IoT as LTE. In certain NB-IoT UL multi-tone transmissions, the available DMRS symbols within the resource unit may be 2 (e.g., for a 12 subcarrier structure), 4 (e.g., for a 6 subcarrier structure), or 8 (e.g., for a 3 subcarrier structure). The current LTE system only has the 12 subcarrier configuration for UL DMRS defined. Accordingly, there is no definition for the 6 subcarrier configuration for UL DMRS and for the 3 subcarrier configuration for UL DMRS.

BRIEF SUMMARY

Apparatuses for reference signal sequence determination are disclosed. Methods and systems also perform the functions of the apparatus. In one embodiment, the apparatus includes a processor that determines an RS sequence for transmission. The RS sequence includes six symbols determined by the following equation: $\bar{r}_u(n) = e^{j\varphi(n)\pi/4}$. The RS sequence includes: a first RS sequence, wherein $\bar{r}_u(n)$ is the first RS sequence, n=0 to 5, φ(0)=−3, φ(1)=−3, φ(2)=−3, φ(3)=−1, φ(4)=1, and φ(5)=−3; a second RS sequence, wherein $\bar{r}_u(n)$ is the second RS sequence, n=0 to 5, φ(0)=1, φ(1)=3, φ(2)=3, φ(3)=1, φ(4)=3, and φ(5)=−1; a third RS sequence, wherein $\bar{r}_u(n)$ is the third RS sequence, n=0 to 5, φ(0)=−3, φ(1)=−1, φ(2)=3, φ(3)=1, φ(4)=3, and φ(5)=3; a fourth RS sequence, wherein $\bar{r}_u(n)$ is the fourth RS sequence, n=0 to 5, φ(0)=−1, φ(1)=−1, φ(2)=3, φ(3)=−3, φ(4)=3, and φ(5)=−1; or a fifth RS sequence, wherein $\bar{r}_u(n)$ is the fifth RS sequence, n=0 to 5, φ(0)=−3, φ(1)=1, φ(2)=−3, φ(3)=3, φ(4)=1, and φ(5)=1. The apparatus may also include a transmitter that transmits the RS sequence on a time-frequency resource.

In certain embodiments, the processor determines the RS sequence from a group of RS sequences including two or more of the first RS sequence, the second RS sequence, the third RS sequence, the fourth RS sequence, and the fifth RS sequence. In some embodiments, the processor determines the RS sequence from a group of RS sequences including the first RS sequence, the second RS sequence, the third RS sequence, the fourth RS sequence, and the fifth RS sequence. In some embodiments, the first RS sequence, the second RS sequence, the third RS sequence, the fourth RS sequence, and the fifth RS sequence have a cross-correlation value less than approximately 0.2. In various embodiments, each of the first RS sequence, the second RS sequence, the third RS sequence, the fourth RS sequence, and the fifth RS sequence has a cubic metric value less than approximately 1.22 dB (1.22 dB is the cubic metric value of QPSK using a cubic metric slope of 1.56).

One method for reference signal sequence determination includes a determining an RS sequence for transmission. The RS sequence includes six symbols determined by the following equation: $\bar{r}_u(n) = e^{j\varphi(n)\pi/4}$. The RS sequence includes: a first RS sequence, wherein $\bar{r}_u(n)$ is the first RS sequence, n=0 to 5, φ(0)=−3, φ(1)=−3, φ(2)=−3, φ(3)=−1, φ(4)=1, and φ(5)=−3; a second RS sequence, wherein $\bar{r}_u(n)$ is the second RS sequence, n=0 to 5, φ(0)=1, φ(1)=3, φ(2)=3, φ(3)=1, φ(4)=3, and φ(5)=−1; a third RS sequence, wherein $\bar{r}_u(n)$ is the third RS sequence, n=0 to 5, φ(0)=−3, φ(1)=−1, φ(2)=3, φ(3)=1, φ(4)=3, and φ(5)=3; a fourth RS sequence, wherein $\bar{r}_u(n)$ is the fourth RS sequence, n=0 to 5, φ(0)=−1, φ(1)=−1, φ(2)=3, φ(3)=−3, φ(4)=3, and φ(5)=−1; or a fifth RS sequence, wherein $\bar{r}_u(n)$ is the fifth RS sequence, n=0 to 5, φ(0)=−3, φ(1)=1, φ(2)=−3, φ(3)=3, φ(4)=1, and φ(5)=1. The method may also include transmitting the RS sequence on a time-frequency resource.

Another apparatus for reference signal sequence determination includes a processor that determines an RS sequence for transmission. The RS sequence includes six symbols determined by the following equation: $\bar{r}_u(n)=e^{j\phi(n)\pi/4}$. The RS sequence includes: a first RS sequence, wherein $\bar{r}_u(n)$ is the first RS sequence, n=0 to 5, φ(0)=−3, φ(1)=−1, φ(2)=3, φ(3)=3, φ(4)=−3, and φ(5)=3; a second RS sequence, wherein $\bar{r}_u(n)$ is the second RS sequence, n=0 to 5, φ(0)=1, φ(1)=3, φ(2)=3, φ(3)=1, φ(4)=3, and φ(5)=−1; a third RS sequence, wherein $\bar{r}_u(n)$ is the third RS sequence, n=0 to 5, φ(0)=−3, φ(1)=1, φ(2)=−1, φ(3)=1, φ(4)=−1, and φ(5)=−1; a fourth RS sequence, wherein $\bar{r}_u(n)$ is the fourth RS sequence, n=0 to 5, φ(0)=3, φ(1)=3, φ(2)=−3, φ(3)=1, φ(4)=−1, and φ(5)=−3; a fifth RS sequence, wherein $\bar{r}_u(n)$ is the fifth RS sequence, n=0 to 5, φ(0)=−1, φ(1)=1, φ(2)=−1, φ(3)=3, φ(4)=3, and φ(5)=−1; a sixth RS sequence, wherein $\bar{r}_u(n)$ is the sixth RS sequence, n=0 to 5, φ(0)=3, φ(1)=−1, φ(2)=1, φ(3)=1, φ(4)=1, and φ(5)=−1; a seventh RS sequence, wherein $\bar{r}_u(n)$ is the seventh RS sequence, n=0 to 5, φ(0)=3, φ(1)=−1, φ(2)=1, φ(3)=−3, φ(4)=−3, and φ(5)=−3; an eighth RS sequence, wherein $\bar{r}_u(n)$ is the eighth RS sequence, n=0 to 5, φ(0)=−3, φ(1)=−3, φ(2)=1, φ(3)=−1, φ(4)=3, and φ(5)=3; a ninth RS sequence, wherein $\bar{r}_u(n)$ is the ninth RS sequence, n=0 to 5, φ(0)=−1, φ(1)=1, φ(2)=1, φ(3)=1, φ(4)=−3, and φ(5)=1; a tenth RS sequence, wherein $\bar{r}_u(n)$ is the tenth RS sequence, n=0 to 5, φ(0)=3, φ(1)=1, φ(2)=−1, φ(3)=1, φ(4)=1, and φ(5)=3; or an eleventh RS sequence, wherein $\bar{r}_u(n)$ is the eleventh RS sequence, n=0 to 5, φ(0)=−3, φ(1)=−3, φ(2)=−3, φ(3)=−1, φ(4)=3, and φ(5)=1. The method may also include transmitting the RS sequence on a time-frequency resource.

A further apparatus includes a processor that determines an RS sequence for transmission. The RS sequence includes three symbols determined by the following equation: $\bar{r}_u(n)=e^{j\phi(n)\pi/4}$. The RS sequence includes: a first RS sequence, wherein $\bar{r}_u(n)$ is the first RS sequence, n=0 to 2, φ(0)=−3, φ(1)=−3, and φ(2)=−1; or a second RS sequence, wherein $\bar{r}_u(n)$ is the second RS sequence, n=0 to 2, φ(0)=−3, φ(1)=1, and φ(2)=1. The apparatus may also include a transmitter that transmits the RS sequence on a time-frequency resource.

In certain embodiments, the processor determines the RS sequence from a group of RS sequences including the first RS sequence and the second RS sequence. In some embodiments, the first RS sequence and the second RS sequence have a cross-correlation value less than approximately 0.2. In various embodiments, each of the first RS sequence and the second RS sequence has a cubic metric value less than approximately 1.22 dB (1.22 dB is the cubic metric value of QPSK using a cubic metric slope of 1.56).

A further method includes determining an RS sequence for transmission. The RS sequence includes three symbols determined by the following equation: $\bar{r}_u(n)=e^{j\phi(n)\pi/4}$. The RS sequence includes: a first RS sequence, wherein $\bar{r}_u(n)$ is the first RS sequence, n=0 to 2, φ(0)=−3, φ(1)=−3, and φ(2)=−1; or a second RS sequence, wherein $\bar{r}_u(n)$ is the second RS sequence, n=0 to 2, φ(0)=−3, φ(1)=1, and φ(2)=1. The method may also include transmitting the RS sequence on a time-frequency resource.

A further apparatus includes a processor that determines a first set of RS sequences by selecting a second set of RS sequences from a complete set of RS sequences. Each RS sequence of the second set of RS sequences has a cubic metric value less than a first predetermined threshold. The processor also selects the first set of RS sequences from the second set of RS sequences by selecting RS sequences of the second set of RS sequences that have a cross-correlation value less than a second predetermined threshold. The apparatus also includes a transmitter that transmits an RS sequence of the first set of RS sequences on a time-frequency resource.

In some embodiments, each RS sequence of the first set of RS sequences has a length of 3. In various embodiments, each RS sequence of the first set of RS sequences has a length of 6.

A further method includes determining a first set of RS sequences by selecting a second set of RS sequences from a complete set of RS sequences. Each RS sequence of the second set of RS sequences has a cubic metric value less than a first predetermined threshold. The method also includes selecting the first set of RS sequences from the second set of RS sequences by selecting RS sequences of the second set of RS sequences that have a cross-correlation value less than a second predetermined threshold. The method also includes transmitting an RS sequence of the first set of RS sequences on a time-frequency resource.

Another apparatus includes a receiver that receives an RS sequence of a first set of RS sequences on a time-frequency resource. The first set of RS sequences are determined by: selecting a second set of RS sequences from a complete set of RS sequences—each RS sequence of the second set of RS sequences has a cubic metric value less than a first predetermined threshold; and selecting the first set of RS sequences from the second set of RS sequences by selecting RS sequences of the second set of RS sequences that have a cross-correlation value less than a second predetermined threshold.

Another method includes receiving an RS sequence of a first set of RS sequences on a time-frequency resource. The first set of RS sequences are determined by: selecting a second set of RS sequences from a complete set of RS sequences—each RS sequence of the second set of RS sequences has a cubic metric value less than a first predetermined threshold; and selecting the first set of RS sequences from the second set of RS sequences by selecting RS sequences of the second set of RS sequences that have a cross-correlation value less than a second predetermined threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
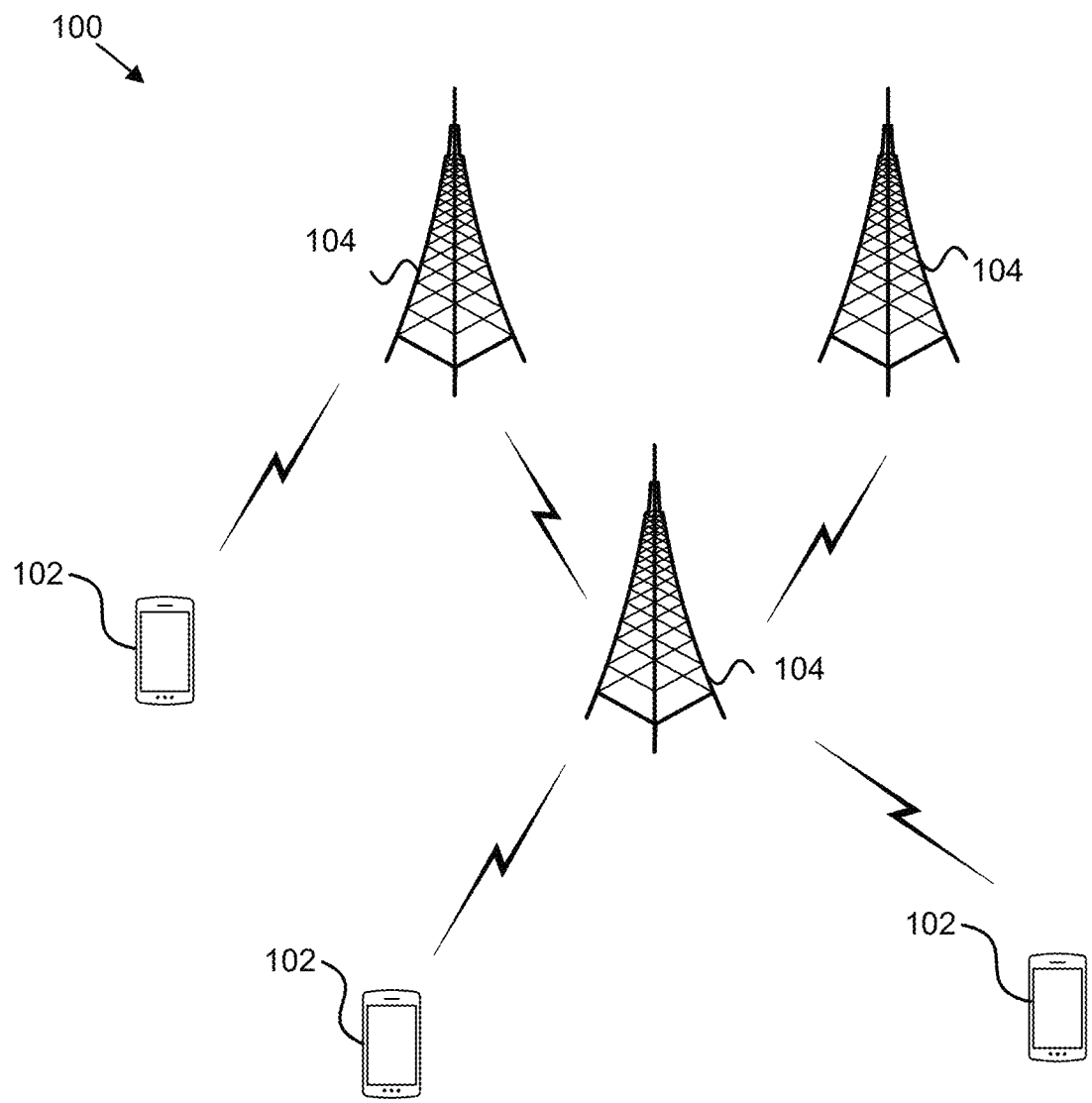
FIG. 1 is a schematic block diagram illustrating one embodiment of a wireless communication system for RS sequence determination.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for RS sequence determination. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), low throughput devices, low delay sensitivity devices, ultra-low cost devices, low power consumption devices, an IoT device, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that may include one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. For example, one or more base units 104 may be communicably coupled to an MME, an SGW, and/or a PGW.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. In another implementation, the wireless communication system 100 is compliant with NB-IoT. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, an apparatus (e.g., remote unit 102) may determine an RS sequence for transmission. The RS sequence may include three or six symbols determined by the following equation: $\bar{r}_u(n) = e^{j\phi(n)\pi/4}$. The apparatus may also transmit the RS sequence on a time-frequency resource. The RS sequence may have a cubic metric value below a first predetermined threshold. Accordingly, power usage of the apparatus may be reduced as compared to RS sequences that have a cubic metric value greater than the first predetermined threshold. Furthermore, a set of RS sequences that are available to the apparatus may all have a cross correlation with each other below a second predetermined threshold. Therefore, interference from neighboring cells also using the set of RS sequences may be reduced as compared to a system of apparatuses that does not use RS sequences having a cross correlation below the second predetermined threshold.

In a further embodiment, an apparatus (e.g., base unit 104) may receive an RS sequence that has a cubic metric value below the first predetermined threshold, and the RS sequence may be part of a set of RS sequences that all have a cross correlation below the second predetermined threshold.

Figure 2:
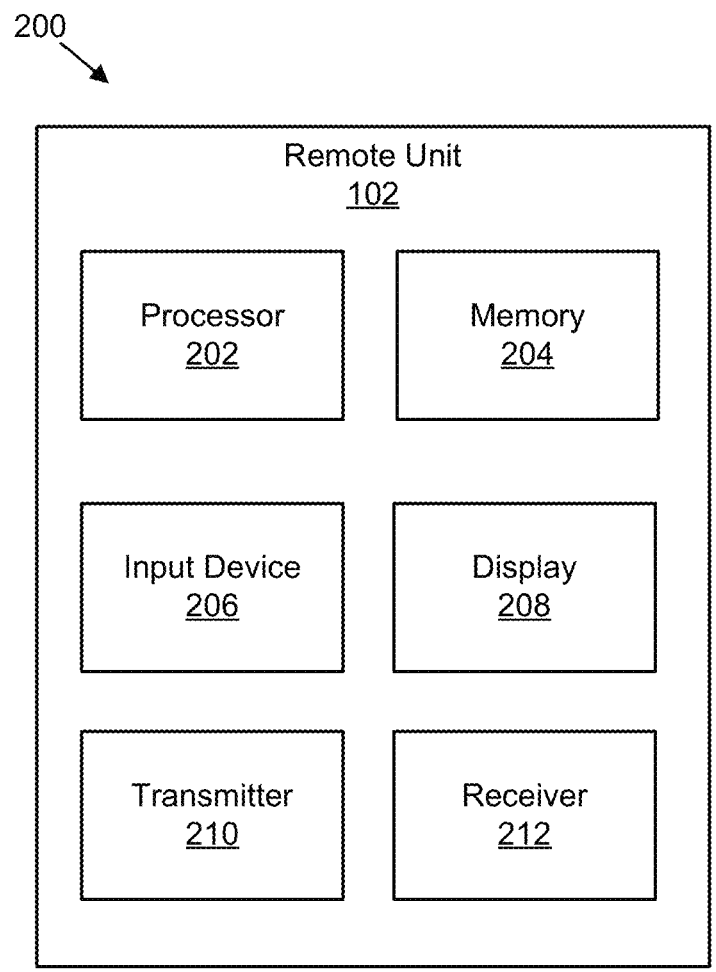
FIG. 2 is a schematic block diagram illustrating one embodiment of an apparatus that may be used for transmitting an RS sequence.

FIG. 2 depicts one embodiment of an apparatus 200 that may be used for transmitting an RS sequence. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine an RS sequence for transmission.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit feedback information and/or an indication to the base unit 104. In some embodiments, the transmitter 210 transmits the RS sequence on a time-frequency resource. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
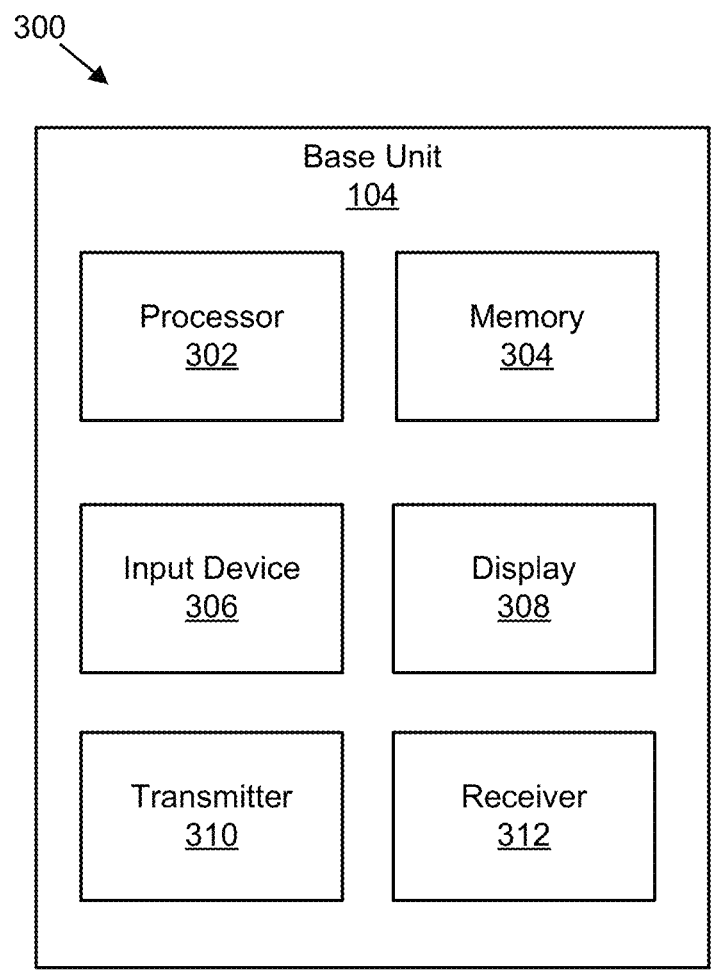
FIG. 3 is a schematic block diagram illustrating one embodiment of an apparatus that may be used for receiving an RS sequence.

FIG. 3 depicts one embodiment of an apparatus 300 that may be used for receiving an RS sequence. The apparatus 300 includes one embodiment of the base unit 104. Furthermore, the base unit 104 may include a processor 302, a memory 304, an input device 306, a display 308, a transmitter 310, and a receiver 312. It should be noted that the processor 302, the memory 304, the input device 306, and the display 308 may be substantially similar to the processor 202, the memory 204, the input device 206, and the display 208 of the remote unit 102, respectively. In certain embodiments, the processor 302 may be used to determine an RS sequence received.

The transmitter 310 is used to provide DL communication signals to the remote unit 102 and the receiver 312 is used to receive UL communication signals from the remote unit 102. In certain embodiments, the receiver 312 is used to receive the RS sequence. It should be noted that, in certain embodiments, an MME, an SGW, and/or a PGW may include one or more components found in the base unit 104. Furthermore, in certain embodiments, the base unit 104 may represent one embodiment of an MME, an SWG or a PGW.

Figure 4:
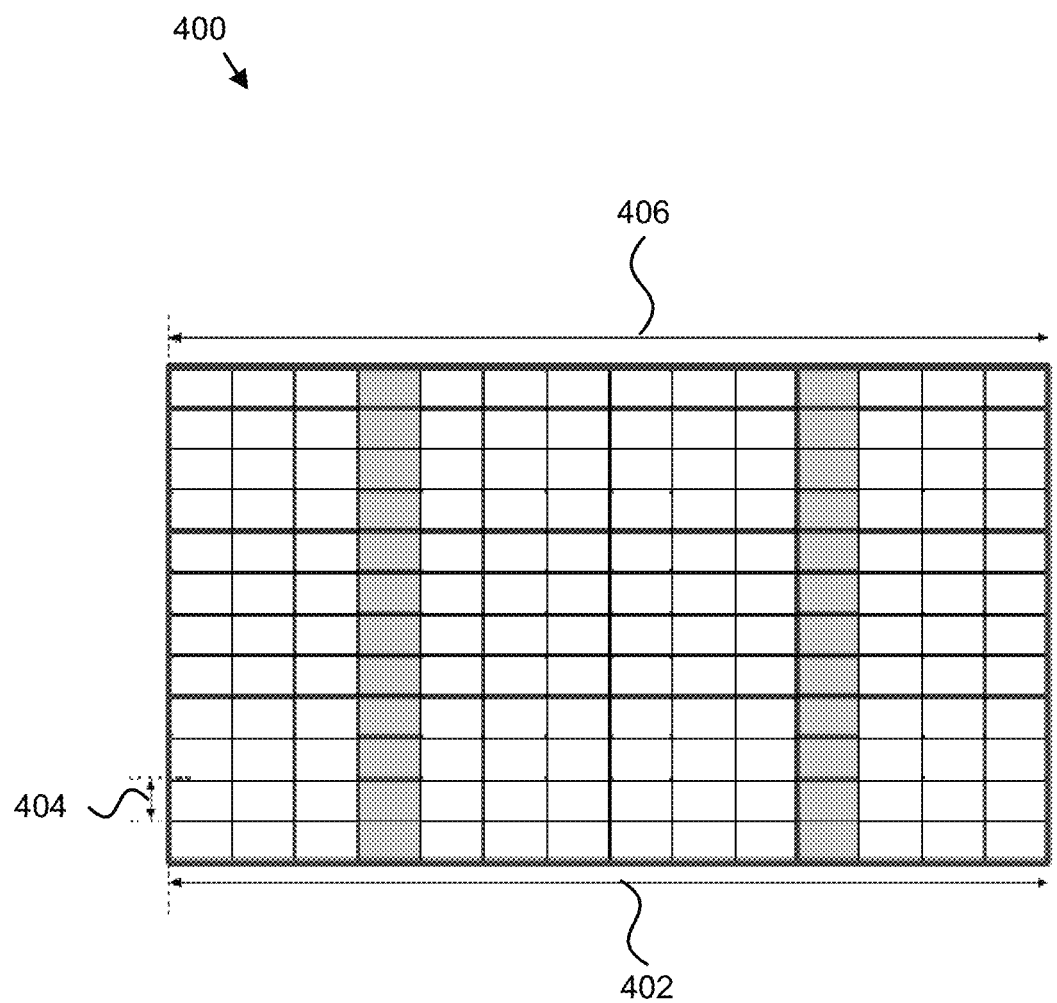
FIG. 4 illustrates one embodiment of time-frequency resources used to transmit an RS sequence.

FIG. 4 illustrates one embodiment of time-frequency resources 400 used to transmit an RS sequence. The time-frequency resources 400 used to transmit an RS sequence may be within a timeframe 402 of 1 ms. Moreover, the time frequency resources 400 include multiple subcarriers 404. Specifically, the illustrated embodiment includes 12 subcarriers 404, which may each have a spacing of 15 kHz. In this embodiment, a resource unit size 406 of 1 ms matches the timeframe 402 of 1 ms. It should be noted that because there are 12 subcarriers, 12-tone transmission may be used for an RS sequence. The 12-tone transmission may use the equation $\bar{r}_u(n) = e^{j\phi(n)\pi/4}$ to determine the twelve symbols for the RS sequence. Moreover, $\varphi(n)$ may be determined using Table 2 presented herein.

Figure 5:
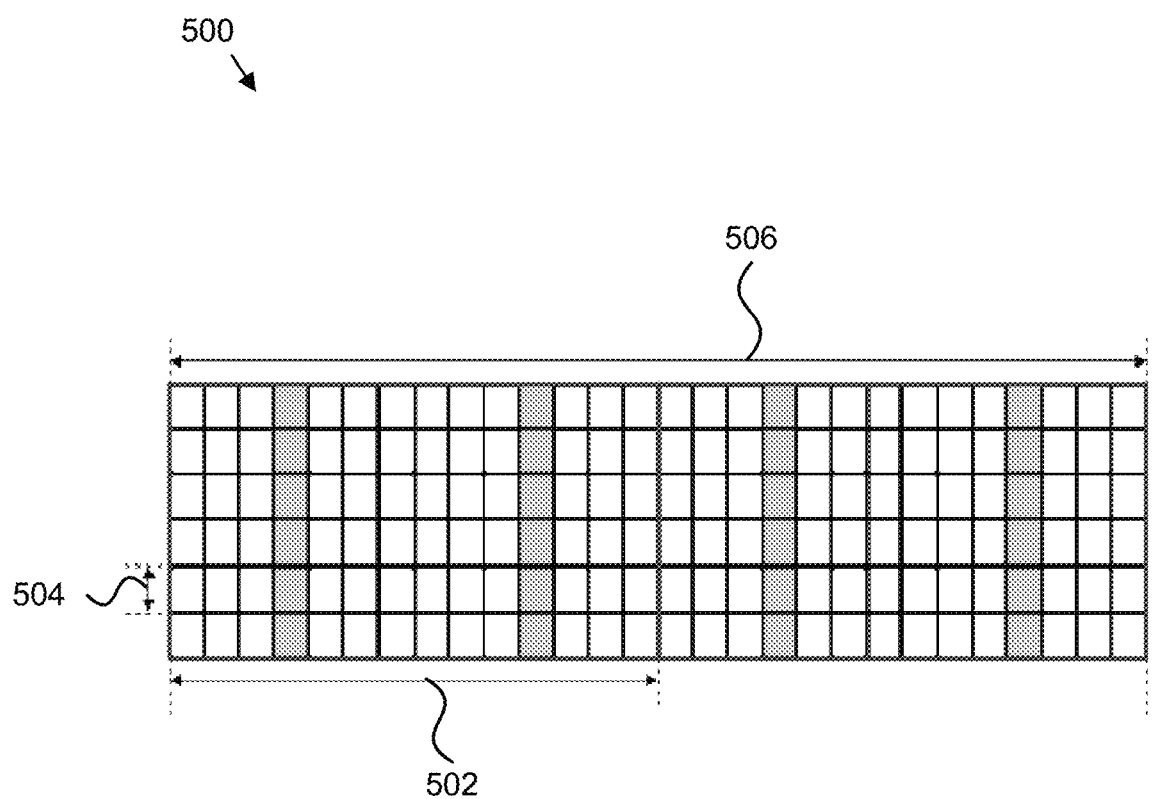
FIG. 5 illustrates another embodiment of time-frequency resources used to transmit an RS sequence.

FIG. 5 illustrates another embodiment of time-frequency resources 500 used to transmit an RS sequence. The time-frequency resources 500 used to transmit an RS sequence may be within a timeframe 502 of 1 ms. Moreover, the time frequency resources 500 include multiple subcarriers 504. Specifically, the illustrated embodiment includes 6 subcarriers 504, which may each have a spacing of 15 kHz. In this embodiment, a resource unit size 506 of 2 ms is twice the size of the timeframe 502 of 1 ms. It should be noted that because there are 6 subcarriers, 6-tone transmission may be used for an RS sequence. The 6-tone transmission may use the equation $\bar{r}_u(n) = e^{j\phi(n)\pi/4}$ to determine the six symbols for the RS sequence. Moreover, $\varphi(n)$ may be determined using one of Table 3 or Table 4 presented herein. The derivation of Tables 3 and 4 will be described in greater detail below.

TABLE 3

| u | $\varphi(0), \ldots, \varphi(5)$ | | | | | |
|---|---|---|---|---|---|---|
| 0 | −3 | −1 | 3 | 3 | −3 | 3 |
| 1 | 1 | 3 | 3 | 1 | 3 | −1 |
| 2 | −3 | 1 | −1 | 1 | −1 | −1 |
| 3 | 3 | 3 | −3 | 1 | −1 | −3 |
| 4 | −1 | 1 | −1 | 3 | 3 | −1 |
| 5 | 3 | −1 | 1 | 1 | 1 | −1 |
| 6 | 3 | −1 | 1 | −3 | −3 | −3 |
| 7 | −3 | −3 | 1 | −1 | 3 | −3 |
| 8 | −1 | 1 | 1 | 1 | −3 | 1 |
| 9 | 3 | 1 | −1 | 1 | 1 | 3 |
| 10 | −3 | −3 | −3 | −1 | 3 | 1 |

TABLE 4

| u | $\phi(0), \ldots, \phi(5)$ | | | | | |
|---|---|---|---|---|---|---|
| 0 | −3 | −3 | −3 | −1 | 1 | −3 |
| 1 | 1 | 3 | 3 | 1 | 3 | −1 |
| 2 | −3 | −1 | 3 | 1 | 3 | 3 |
| 3 | −1 | −1 | 3 | −3 | 3 | −1 |
| 4 | −3 | 1 | −3 | 3 | 1 | 1 |

Figure 6:
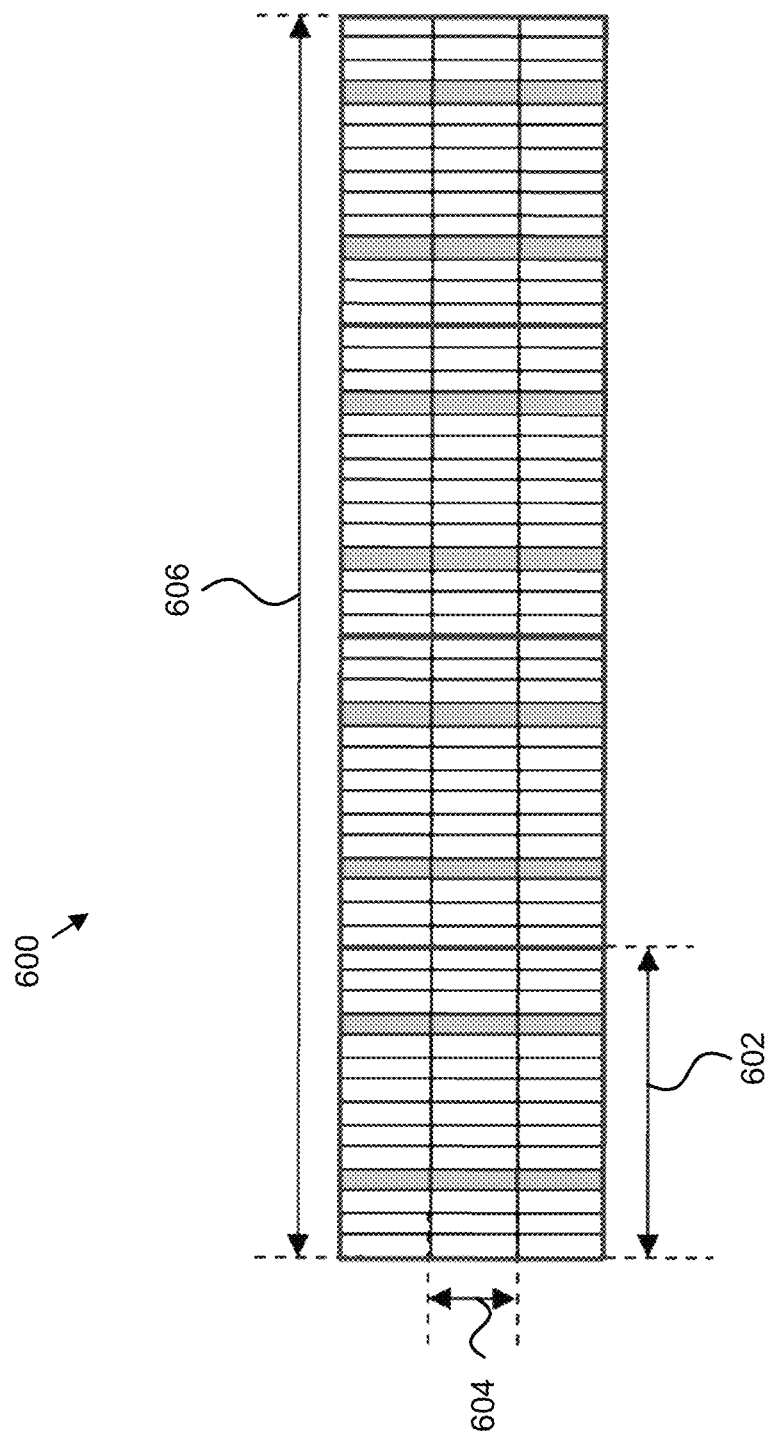
FIG. 6 illustrates a further embodiment of time-frequency resources used to transmit an RS sequence.

FIG. 6 illustrates a further embodiment of time-frequency resources 600 used to transmit an RS sequence. The time-frequency resources 600 used to transmit an RS sequence may be within a timeframe 602 of 1 ms. Moreover, the time frequency resources 600 include multiple subcarriers 604. Specifically, the illustrated embodiment includes 3 subcarriers 604, which may each have a spacing of 15 kHz. In this embodiment, a resource unit size 606 of 4 ms is four times the size of the timeframe 602 of 1 ms. It should be noted that because there are 3 subcarriers, 3-tone transmission may be used for an RS sequence. The 3-tone transmission may use the equation $\bar{r}_u(n)=e^{j\phi(n)\pi/4}$ to determine the three symbols for the RS sequence. Moreover, φ(n) may be determined using Table 5 presented herein. The derivation of Tables 5 will be described in greater detail below.

TABLE 5

| u | φ(0), . . . , φ(2) | | |
|---|---|---|---|
| 0 | −3 | −3 | −1 |
| 1 | −3 | 1 | 1 |

For 3-tone and 6-tone RS determination, the sequence $\bar{r}_u(n)$ is given by: $\bar{r}_u(n)=e^{j\phi(n)\pi/4}$, $0 \leq n \leq M_{sc}^{RS}-1$, where the value of φ(n) may use values from Table 3, Table 4, or Table 5. The sequence-group number u in slot $n_s$ is defined by a group hopping pattern $f_{gh}(n_s)$ and a sequence-shift pattern $f_{ss}$, here U is the total number of the RS sequence.

$$u=(f_{gh}(n_s)+f_{ss}) \bmod U$$

The PUSCH demodulation reference signal sequence $r_{PUSCH}(\cdot)$ is defined by $$r_{PUSCH}(m \cdot M_{sc}^{RS}+n)=w(m)\bar{r}_u(n)$$

where $$m = \begin{cases} 0, 1, 2, 3 & \text{6-tone case} \\ 0, 1, \ldots, 7 & \text{3-tone case} \end{cases}$$

$$n = 0, \ldots, M_{sc}^{RS} - 1$$

The orthogonal sequence w(n) is an OCC sequence given by higher layer signaling, for example, the orthogonal sequence w(m) may be the Walsh-code with a length of 8 for a 3-tone DMRS and the orthogonal sequence w(m) may be the Walsh-code with a length of 4 for a 6-tone DMRS. In another embodiment, the orthogonal sequence w(n) may be a 4 Walsh-code with a length of 2 for a 3-tone DMRS and the orthogonal sequence w(n) may be a 2 Walsh-code with a length of 2 for a 6-tone DMRS.

It should be noted that QPSK may be used for each element of an RS sequence. QPSK-based sequences may be beneficial because they may have constant amplitude and a low cubic metric property. If QPSK symbols are used for 3-tone transmission, each element of a sequence uses the value of one out of four possible QPSK symbols. Therefore, the total number of possible 3-tone sequences is 64 (e.g., $4^3$). If QPSK symbols are used for 6-tone transmission, following the same reasoning of 3-tone sequences, there are in total of 4096 (e.g., $4^6$) sequences that may be used. Therefore, because there are a large possible number of sequences, there may be flexibility in determining a useful set of sequences.

To determine a useful set of sequences, φ(n) may be determined. One embodiment of the generation of φ(n) used to populate Table 3, Table 4, and Table 5 is described in the following paragraphs.

First, the sequences out of the number of possible sequences which have low cubic metric value are selected. Cubic metric ("CM") is the metric of the actual reduction in power capability, or power de-rating, of a typical power amplifier in a remote unit 102. In some embodiments, peak-to-average power ratio ("PAPR") may be used instead of the CM value. In one embodiment, sequences with a cubic metric value smaller than a first predetermined threshold (e.g., TH1) are selected. The first predetermined threshold may be any suitable value. For example, the first predetermined threshold may be based on the CM value of QPSK using a CM slope of 1.56 so that the RS CM value may be compared with the QPSK CM value. In the embodiment used to determine the sequences of Tables 3, 4, and 5, the first predetermined threshold equals approximately 1.22 dB. The selected sequences may be considered Set A.

It should be noted that cubic metric value ("CM") may be calculated using the following formula: CM=[20*$\log_{10}$((v_norm$^3$)rms)−20*$\log_{10}$((v_norm_ref$^3$)rms)]/1.85, where "v_norm" is the normalized voltage waveform of the input signal; an empirical factor 1.85 is determined based on the simulation results; "v_norm_ref" is the reference signal; 20*$\log_{10}$((v_norm_ref$^3$)rms)=1.5237 dB may be used as a simplified version of a speech 12.2 Kbps adaptive multi-rate ("AMR") cubic reference value; and rms is the square root of the arithmetic mean of the squares of the values.

Second, the sequences that have a low cross-correlation with each other are selected from the Set A. This may be performed by: 1) randomly selecting one sequence (e.g., $a_0$) from Set A and adding the sequence to a new set, Set B, then removing the sequence from Set A; 2) randomly selecting another sequence (e.g., $a_i$) from Set A (e.g., $a_i \notin B$) if the cross-correlation values between $a_i$ and the sequences of Set B are smaller than a second predetermined threshold (e.g., TH2), add the sequence $a_i$ into Set B, then remove the sequence $a_i$ from Set A and randomly select another sequence $a_j$ (e.g., $a_j \notin B$) from Set A, repeat the step 2) until the Set A is NULL (e.g., empty), if one of the cross-correlation values between $a_i$ and the sequences of Set B is larger than the second predetermined threshold, then remove the sequence $a_i$ from Set A, and randomly select another sequence $a_j$ (e.g., $a_j \notin B$), repeat the step b) until the Set A is NULL; and 3) the sequences of Set B are the final RS sequences that have a low cubic metric value and a low cross correlation value with each other. In the embodiment used to determine the sequences of Tables 4 and 5, the second predetermined threshold equals approximately 0.2. Moreover, in the embodiment used to determine the sequences of Table 3, the second predetermined threshold equals approximately 0.5. It should be noted that the second predetermined threshold may be any suitable value that results in a low cross correlation value.

In certain embodiments, the cross-correlation (e.g., R) of a first sequence (e.g., x) and a second sequence (e.g., y) may be calculated using the following equation: $R_{xy}=E\{xy\}$, where x and y are the normalized sequences of an input signal; and $E\{x\}$ is an expectation mean value of sequence x.

Figure 7:
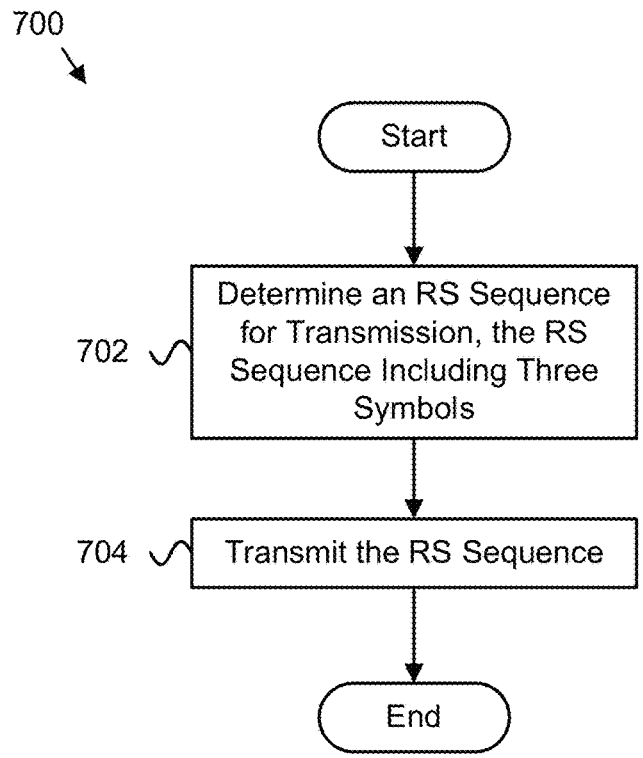
FIG. 7 is a schematic flow chart diagram illustrating one embodiment of a method for transmitting an RS sequence.

FIG. 7 is a schematic flow chart diagram illustrating one embodiment of a method 700 for transmitting an RS sequence. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include determining 702 an RS sequence for transmission. In one embodiment, the RS sequence includes three symbols determined by the following equation: $\bar{r}_u(n)=e^{j\phi(n)\pi/4}$. In such an embodiment, the RS sequence includes: a first RS sequence, wherein $\bar{r}_u(n)$ is the first RS sequence, n=0 to 2, φ(0)=−3, φ(1)=−3, and φ(2)=−1; or a second RS sequence, wherein $\bar{r}_u(n)$ is the second RS sequence, n=0 to 2, φ(0)=−3, φ(1)=1, and φ(2)=1. The method 700 may include transmitting 704 the RS sequence on a time-frequency resource, and the method 700 may end.

In certain embodiments, the method 700 determines the RS sequence from a group of RS sequences including the first RS sequence and the second RS sequence. In some embodiments, the first RS sequence and the second RS sequence have a cross-correlation value less than approximately 0.2. In various embodiments, each of the first RS sequence and the second RS sequence has a cubic metric value less than approximately 1.22 dB.

Figure 8:
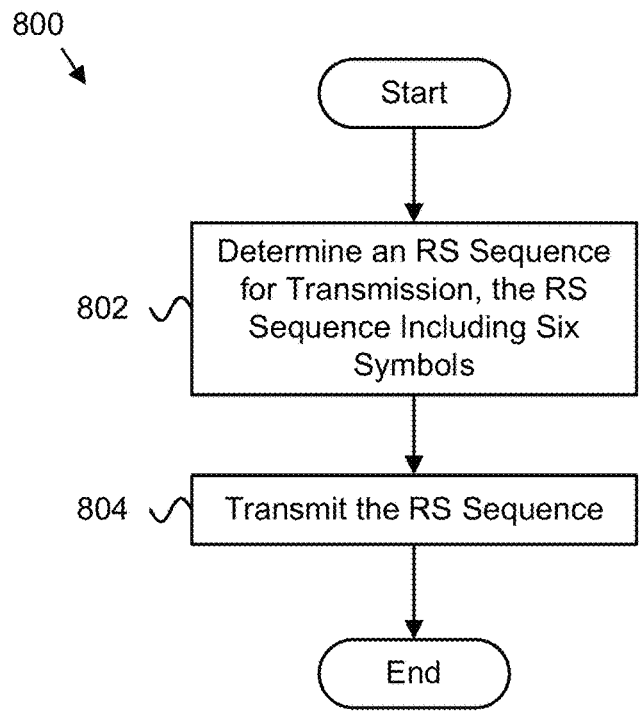
FIG. 8 is a schematic flow chart diagram illustrating another embodiment of a method for transmitting an RS sequence.

FIG. 8 is a schematic flow chart diagram illustrating another embodiment of a method 800 for transmitting an RS sequence. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include determining 802 an RS sequence for transmission. In certain embodiments, the RS sequence includes six symbols determined by the following equation: $\bar{r}_u(n)=e^{j\phi(n)\pi/4}$. In such embodiments, the RS sequence includes: a first RS sequence, wherein $\bar{r}_u(n)$ is the first RS sequence, n=0 to 5, φ(0)=−3, φ(1)=−3, φ(2)=−3, φ(3)=−1, φ(4)=1, and φ(5)=−3; a second RS sequence, wherein $\bar{r}_u(n)$ is the second RS sequence, n=0 to 5, φ(0)=1, φ(1)=3, φ(2)=3, φ(3)=1, φ(4)=3, and φ(5)=−1; a third RS sequence, wherein $\bar{r}_u(n)$ is the third RS sequence, n=0 to 5, φ(0)=−3, φ(1)=−1, φ(2)=3, φ(3)=1, φ(4)=3, and φ(5)=3; a fourth RS sequence, wherein $\bar{r}_u(n)$ is the fourth RS sequence, n=0 to 5, φ(0)=−1, φ(1)=−1, φ(2)=3, φ(3)=−3, φ(4)=3, and φ(5)=−1; or a fifth RS sequence, wherein $\bar{r}_u(n)$ is the fifth RS sequence, n=0 to 5, φ(0)=−3, φ(1)=1, φ(2)=−3, φ(3)=3, φ(4)=1, and φ(5)=1.

In one embodiment, the RS sequence includes: a first RS sequence, wherein $\bar{r}_u(n)$ is the first RS sequence, n=0 to 5, φ(0)=−3, φ(1)=−1, φ(2)=3, φ(3)=3, φ(4)=−3, and φ(5)=3; a second RS sequence, wherein $\bar{r}_u(n)$ is the second RS sequence, n=0 to 5, φ(0)=1, φ(1)=3, φ(2)=3, φ(3)=1, φ(4)=3, and φ(5)=−1; a third RS sequence, wherein $\bar{r}_u(n)$ is the third RS sequence, n=0 to 5, φ(0)=−3, φ(1)=1, φ(2)=−1, φ(3)=1, φ(4)=−1, and φ(5)=−1; a fourth RS sequence, wherein $\bar{r}_u(n)$ is the fourth RS sequence, n=0 to 5, φ(0)=3, φ(1)=3, φ(2)=−3, φ(3)=1, φ(4)=−1, and φ(5)=−3; a fifth RS sequence, wherein $\bar{r}_u(n)$ is the fifth RS sequence, n=0 to 5, φ(0)=−1, φ(1)=1, φ(2)=−1, φ(3)=3, φ(4)=3, and φ(5)=−1; a sixth RS sequence, wherein $\bar{r}_u(n)$ is the sixth RS sequence, n=0 to 5, φ(0)=3, φ(1)=−1, φ(2)=1, φ(3)=1, φ(4)=1, and φ(5)=−1; a seventh RS sequence, wherein $\bar{r}_u(n)$ is the seventh RS sequence, n=0 to 5, φ(0)=3, φ(1)=−1, φ(2)=1, φ(3)=−3, φ(4)=−3, and φ(5)=−3; an eighth RS sequence, wherein $\bar{r}_u(n)$ is the eighth RS sequence, n=0 to 5, φ(0)=−3, φ(1)=−3, φ(2)=1, φ(3)=−1, φ(4)=3, and φ(5)=3; a ninth RS sequence, wherein $\bar{r}_u(n)$ is the ninth RS sequence, n=0 to 5, φ(0)=−1, φ(1)=1, φ(2)=1, φ(3)=1, φ(4)=−3, and φ(5)=1; a tenth RS sequence, wherein $\bar{r}_u(n)$ is the tenth RS sequence, n=0 to 5, φ(0)=3, φ(1)=1, φ(2)=−1, φ(3)=1, φ(4)=1, and φ(5)=3; or an eleventh RS sequence, wherein $\bar{r}_u(n)$ is the eleventh RS sequence, n=0 to 5, φ(0)=−3, φ(1)=−3, φ(2)=−3, φ(3)=−1, φ(4)=3, and φ(5)=1.

The method 800 may also include transmitting 804 the RS sequence on a time-frequency resource and the method 800 may end. In certain embodiments, the method 800 determines the RS sequence from a group of RS sequences including two or more of the first RS sequence, the second RS sequence, the third RS sequence, the fourth RS sequence, and the fifth RS sequence. In some embodiments, the method 800 determines the RS sequence from a group of RS sequences including the first RS sequence, the second RS sequence, the third RS sequence, the fourth RS sequence, and the fifth RS sequence. In some embodiments, the first RS sequence, the second RS sequence, the third RS sequence, the fourth RS sequence, and the fifth RS sequence have a cross-correlation value less than approximately 0.2. In various embodiments, each of the first RS sequence, the second RS sequence, the third RS sequence, the fourth RS sequence, and the fifth RS sequence has a cubic metric value less than approximately 1.22 dB.

In certain embodiments, the method 800 determines the RS sequence from a group of RS sequences including two or more of the first RS sequence, the second RS sequence, the third RS sequence, the fourth RS sequence, the fifth RS sequence, the sixth RS sequence, the seventh RS sequence, the eighth RS sequence, the ninth RS sequence, the tenth RS sequence, and the eleventh RS sequence. In some embodiments, the method 800 determines the RS sequence from a group of RS sequences including the first RS sequence, the second RS sequence, the third RS sequence, the fourth RS sequence, the fifth RS sequence, the sixth RS sequence, the seventh RS sequence, the eighth RS sequence, the ninth RS sequence, the tenth RS sequence, and the eleventh RS sequence. In some embodiments, the first RS sequence, the second RS sequence, the third RS sequence, the fourth RS sequence, the fifth RS sequence, the sixth RS sequence, the seventh RS sequence, the eighth RS sequence, the ninth RS sequence, the tenth RS sequence, and the eleventh RS sequence have a cross-correlation value less than approximately 0.5. In one embodiment, each of the first RS sequence, the second RS sequence, the third RS sequence, the fourth RS sequence, the fifth RS sequence, the sixth RS sequence, the seventh RS sequence, the eighth RS sequence, the ninth RS sequence, the tenth RS sequence, and the eleventh RS sequence has a cubic metric value less than approximately 1.22 dB.

Figure 9:
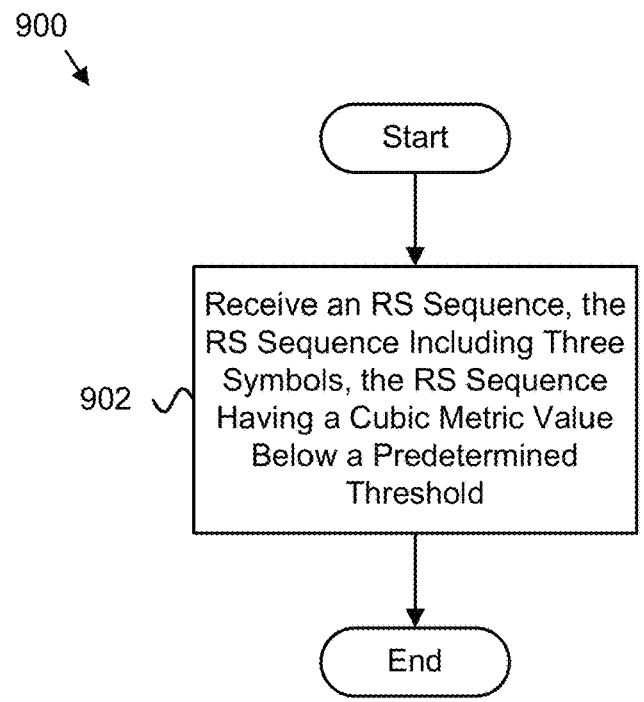
FIG. 9 is a schematic flow chart diagram illustrating one embodiment of a method for receiving an RS sequence.

FIG. 9 is a schematic flow chart diagram illustrating one embodiment of a method 900 for receiving an RS sequence. In some embodiments, the method 900 is performed by an apparatus, such as the base unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 an RS sequence of a first set of RS sequences on a time-frequency resource, the RS sequence including three symbols, wherein the RS sequence has a cubic metric value below a predetermined threshold, and the method 900 may end. The first set of RS sequences are determined by selecting a second set of RS sequences from a complete set of RS sequences, wherein each RS sequence of the second set of RS sequences has a cubic metric value less than a first predetermined threshold; and selecting the first set of RS sequences from the second set of RS sequences by selecting RS sequences of the second set of RS sequences that have a cross-correlation value less than a second predetermined threshold.

Figure 10:
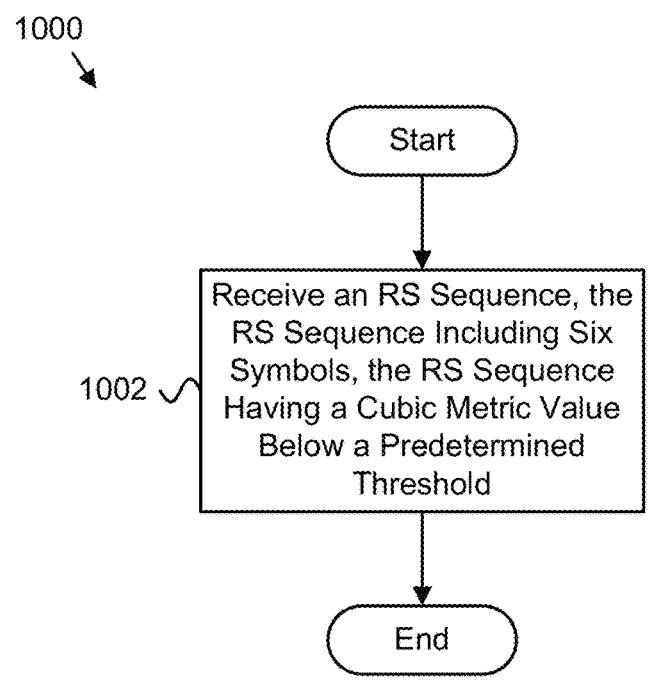
FIG. 10 is a schematic flow chart diagram illustrating another embodiment of a method for receiving an RS sequence.

FIG. 10 is a schematic flow chart diagram illustrating another embodiment of a method 1000 for receiving an RS sequence. In some embodiments, the method 1000 is performed by an apparatus, such as the base unit 104. In certain embodiments, the method 1000 may be performed by a processor executing program code, for example, a microcontroller, a microprocessor, a CPU, a GPU, an auxiliary processing unit, a FPGA, or the like.

The method 1000 may include receiving 1002 an RS sequence of a first set of RS sequences on a time-frequency resource, the RS sequence including six symbols, wherein the RS sequence has a cubic metric value below a predetermined threshold, and the method 1000 may end. The first set of RS sequences are determined by selecting a second set of RS sequences from a complete set of RS sequences, wherein each RS sequence of the second set of RS sequences has a cubic metric value less than a first predetermined threshold; and selecting the first set of RS sequences from the second set of RS sequences by selecting RS sequences of the second set of RS sequences that have a cross-correlation value less than a second predetermined threshold.

Figure 11:
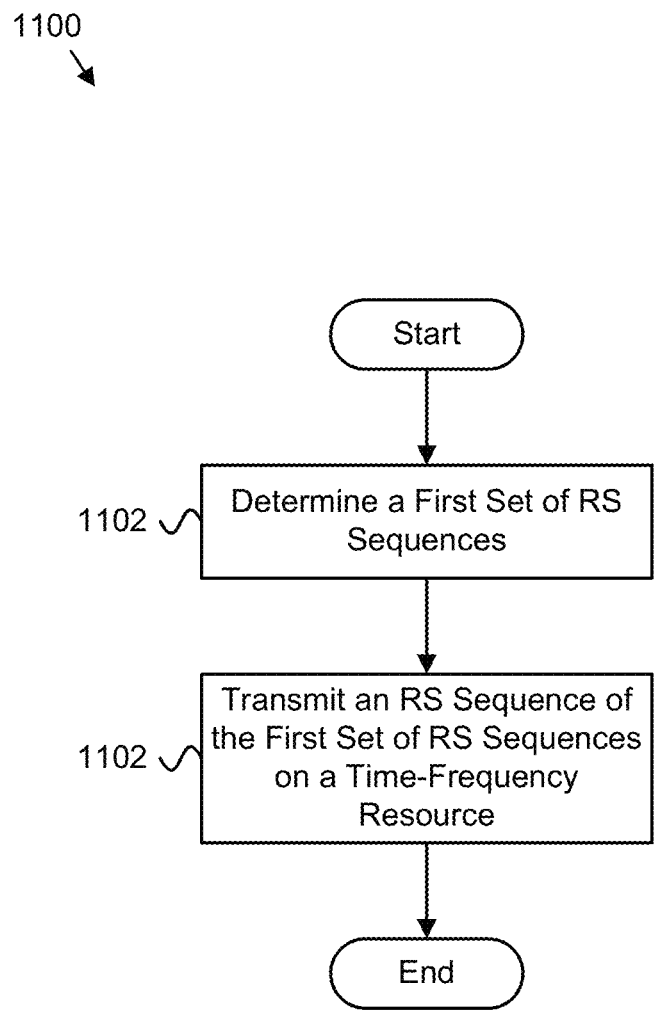
FIG. 11 is a schematic flow chart diagram illustrating one embodiment of a method for determining an RS sequence.

FIG. 11 is a schematic flow chart diagram illustrating another embodiment of a method 1100 for determining an RS sequence. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include determining 1102 a first set of RS sequences. In certain embodiments, determining 1102 the first set of RS sequences includes selecting a second set of RS sequences from a complete set of RS sequences. In such embodiments, each RS sequence of the second set of RS sequences has a cubic metric value less than a first predetermined threshold. Moreover, determining 1102 the first set of RS sequences also includes selecting the first set of RS sequences from the second set of RS sequences by selecting RS sequences of the second set of RS sequences that have a cross-correlation value less than a second predetermined threshold. The method 1100 may include transmitting 1102 an RS sequence of the first set of RS sequences on a time-frequency resource, and the method 1100 may end. In some embodiments, each RS sequence of the first set of RS sequences has a length of 3. In various embodiments, each RS sequence of the first set of RS sequences has a length of 6.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining, by a user equipment, a reference signal ("RS") sequence having a cubic metric value less than a threshold resulting in reduced power usage for transmission, the RS sequence consists of six symbols determined by the following equation: $\bar{r}_u(n)=e^{j\phi(n)\pi/4}$, wherein n=0 to 5, $\varphi(0)$=3, 1, −1, or −3, $\varphi(1)$=3, 1, −1, or −3, $\varphi(2)$=3, 1, −1, or −3, $\varphi(3)$=3, 1, −1, or −3, $\varphi(4)$=3, 1, −1, or −3, and $\varphi(5)$=3, 1, −1, or −3; and
   transmitting from the user equipment the RS sequence on a time-frequency resource, wherein the time-frequency resource for transmitting the RS sequence consists of six tones in a frequency domain by one symbol in a time domain such that the RS sequence concurrently occupies only the one symbol in the time domain in each of the six tones in the frequency domain.

2. The method of claim 1, wherein determining the RS sequence for transmission comprises selecting the RS sequence from a group of RS sequences comprising two or more RS sequences selected from: a first RS sequence, a second RS sequence, a third RS sequence, a fourth RS sequence, and a fifth RS sequence.

3. The method of claim 1, wherein determining the RS sequence for transmission comprises selecting the RS sequence from a group of RS sequences comprising a first RS sequence, a second RS sequence, a third RS sequence, a fourth RS sequence, and a fifth RS sequence.

4. The method of claim 1, wherein each pair of RS sequences selected from a group of RS sequences comprising a first RS sequence, a second RS sequence, a third RS sequence, a fourth RS sequence, and a fifth RS sequence has a cross-correlation value less than 0.2.

5. The method of claim 1, wherein each of a first RS sequence, a second RS sequence, a third RS sequence, a fourth RS sequence, and a fifth RS sequence has a cubic metric value less than 1.22 dB.

6. The method of claim 1, wherein the RS sequence comprises a first RS sequence in which $\varphi(0)$=−3, $\varphi(1)$=−3, $\varphi(2)$=−3, $\varphi(3)$=−1, $\varphi(4)$=1, and $\varphi(5)$=−3.

7. The method of claim 1, wherein the RS sequence comprises a second RS sequence in which $\varphi(0)$=1, $\varphi(1)$=3, $\varphi(2)$=3, $\varphi(3)$=1, $\varphi(4)$=3, and $\varphi(5)$=−1.

8. The method of claim 1, wherein the RS sequence comprises a third RS sequence in which $\varphi(0)$=−3, $\varphi(1)$=−1, $\varphi(2)$=3, $\varphi(3)$=1, $\varphi(4)$=3, and $\varphi(5)$=3.

9. The method of claim 1, wherein the RS sequence comprises a fourth RS sequence in which $\varphi(0)$=−1, $\varphi(1)$=−1, $\varphi(2)$=3, $\varphi(3)$=−3, $\varphi(4)$=3, and $\varphi(5)$=−1.

10. The method of claim 1, wherein the RS sequence comprises a fifth RS sequence in which $\varphi(0)$=−3, $\varphi(1)$=1, $\varphi(2)$=−3, $\varphi(3)$=3, $\varphi(4)$=1, and $\varphi(5)$=1.

11. The method of claim 1, further comprising determining a group of RS sequences comprising:
   a first RS sequence in which $\varphi(0)$=−3, $\varphi(1)$=−3, $\varphi(2)$=−3, $\varphi(3)$=−1, $\varphi(4)$=1, and $\varphi(5)$=−3;
   a second RS sequence in which $\varphi(0)$=1, $\varphi(1)$=3, $\varphi(2)$=3, $\varphi(3)$=1, $\varphi(4)$=3, and $\varphi(5)$=−1;
   a third RS sequence in which $\varphi(0)$=−3, $\varphi(1)$=−1, $\varphi(2)$=3, $\varphi(3)$=1, $\varphi(4)$=3, and $\varphi(5)$=3;
   a fourth RS sequence in which $\varphi(0)$=−1, $\varphi(1)$=−1, $\varphi(2)$=3, $\varphi(3)$=−3, $\varphi(4)$=3, and $\varphi(5)$=−1; or
   a fifth RS sequence in which $\varphi(0)$=−3, $\varphi(1)$=1, $\varphi(2)$=−3, $\varphi(3)$=3, $\varphi(4)$=1, and $\varphi(5)$=1.

12. The method of claim 1, wherein u is selected from a group comprising 0 to 10.

13. A method comprising:
   determining, by a user equipment, a reference signal ("RS") sequence having a cubic metric value less than a threshold resulting in reduced power usage for transmission, the RS sequence consists of three symbols determined by the following equation: $\bar{r}_u(n)=e^{j\phi(n)\pi/4}$, wherein n=0 to 2, $\varphi(0)$=3, 1, −1, or −3, $\varphi(1)$=3, 1, −1, or −3, and $\varphi(2)$=3, 1, −1, or −3; and
   transmitting from the user equipment the RS sequence on a time-frequency resource, wherein the time-frequency resource for transmitting the RS sequence consists of three tones in a frequency domain by one symbol in a time domain such that the RS sequence concurrently occupies only the one symbol in the time domain in each of the three tones in the frequency domain.

14. The method of claim 13, wherein determining the RS sequence for transmission comprises determining the RS sequence from a group of RS sequences comprising a first RS sequence and a second RS sequence.

15. The method of claim 13, wherein a pair of RS sequences comprising a first RS sequence and a second RS sequence has a cross-correlation value less than 0.2.

16. The method of claim 13, wherein each of a first RS sequence and a second RS sequence has a cubic metric value less than 1.22 dB.

17. The method of claim 13, wherein the RS sequence comprises a first RS sequence in which $\varphi(0)=-3$, $\varphi(1)=-3$, and $\varphi(2)=-1$.

18. The method of claim 13, wherein the RS sequence comprises a second RS sequence in which $\varphi(0)=-3$, $\varphi(1)=1$, and $\varphi(2)=1$.

19. The method of claim 13, wherein u is selected from a group comprising 0 to 1.

20. A method comprising:
    receiving, at a network device, a reference signal ("RS") sequence of on a time-frequency resource having a cubic metric value less than a threshold resulting in reduced power usage, wherein the time-frequency resource consists of six tones in a frequency domain by one symbol in a time domain such that the RS sequence concurrently occupies only the one symbol in the time domain in each of the six tones in the frequency domain, and the RS sequence consists of six symbols determined by the following equation: $\bar{r}_u(n)=e^{j\varphi(n)\pi/4}$, wherein n=0 to 5, $\varphi(0)=3$, 1, −1, or −3, $\varphi(1)=3$, 1, −1, or −3, $\varphi(2)=3$, 1, −1, or −3, $\varphi(3)=3$, 1, −1, or −3, $\varphi(4)=3$, 1, −1, or −3, and $\varphi(5)=3$, 1, −1, or −3.

21. A method comprising:
    receiving, at a network device, a reference signal ("RS") sequence of on a time-frequency resource having a cubic metric value less than a threshold resulting in reduced power usage, wherein the time-frequency resource consists of three tones in a frequency domain by one symbol in a time domain such that the RS sequence concurrently occupies only the one symbol in the time domain in each of the six tones in the frequency domain, and the RS sequence consists of three symbols determined by the following equation: $\bar{r}_u(n)=e^{j\varphi(n)\pi/4}$, wherein n=0 to 2, $\varphi(0)=3$, 1, −1, or −3, $\varphi(1)=3$, 1, −1, or −3, and $\varphi(2)=3$, 1, −1, or −3.

* * * * *